Figure 1:
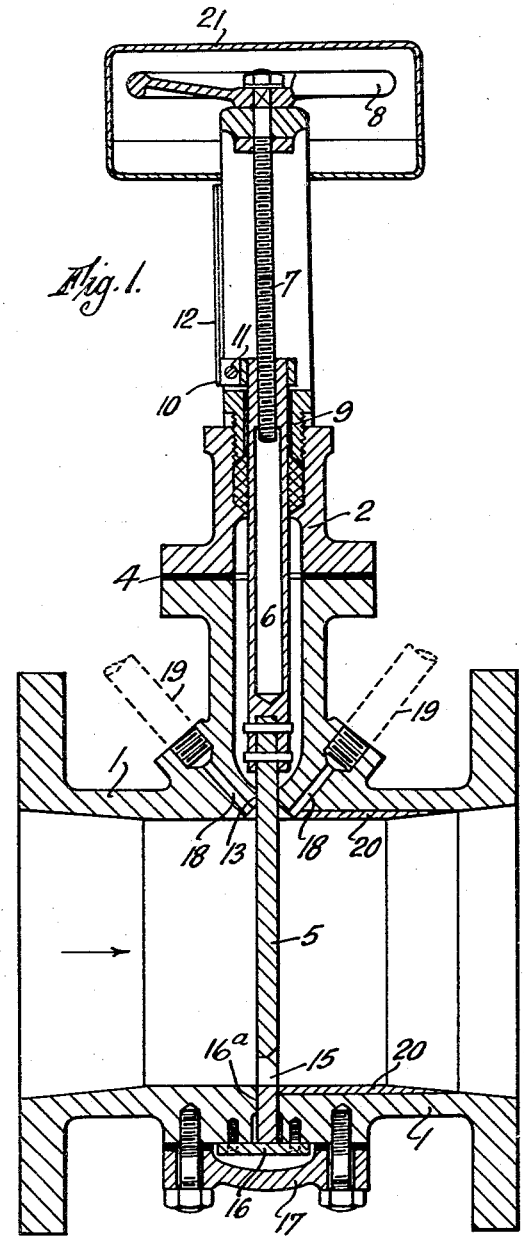

Feb. 6, 1934.  J. L. HODGSON ET AL  1,946,319
VARIABLE ORIFICE FOR MEASURING THE FLOW OF FLUIDS
Filed Nov. 5, 1931   5 Sheets-Sheet 1

Feb. 6, 1934.  J. L. HODGSON ET AL  1,946,319
VARIABLE ORIFICE FOR MEASURING THE FLOW OF FLUIDS
Filed Nov. 5, 1931  5 Sheets-Sheet 2
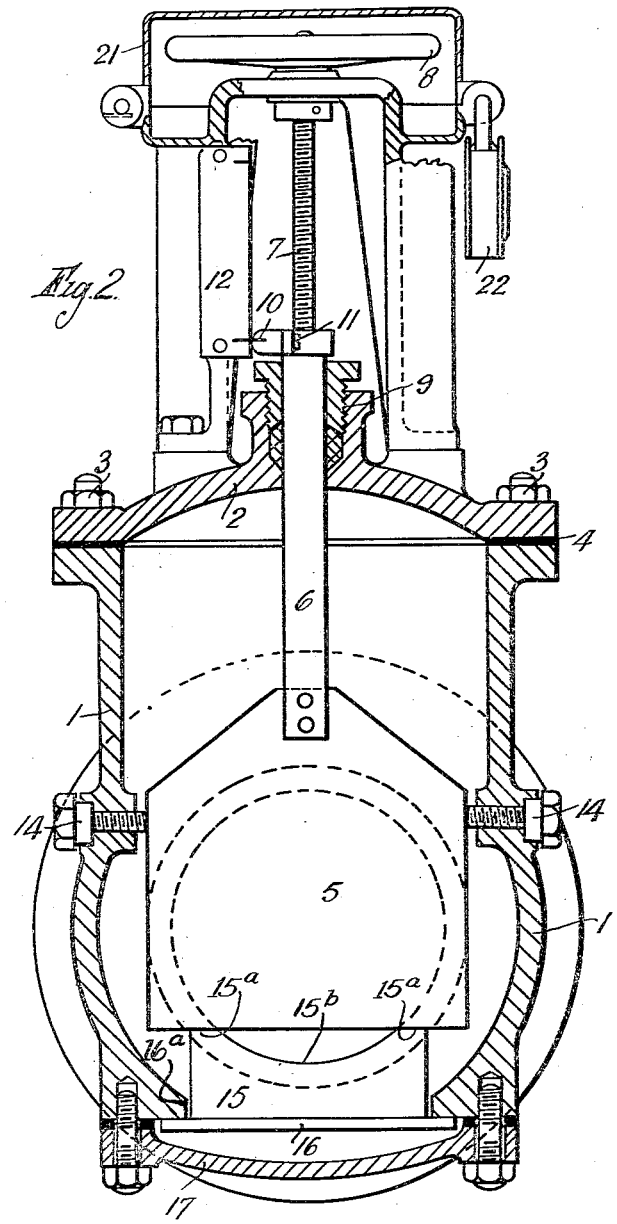
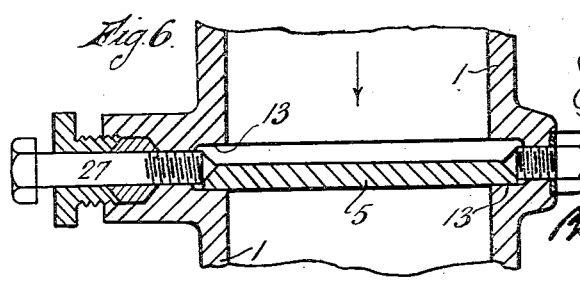

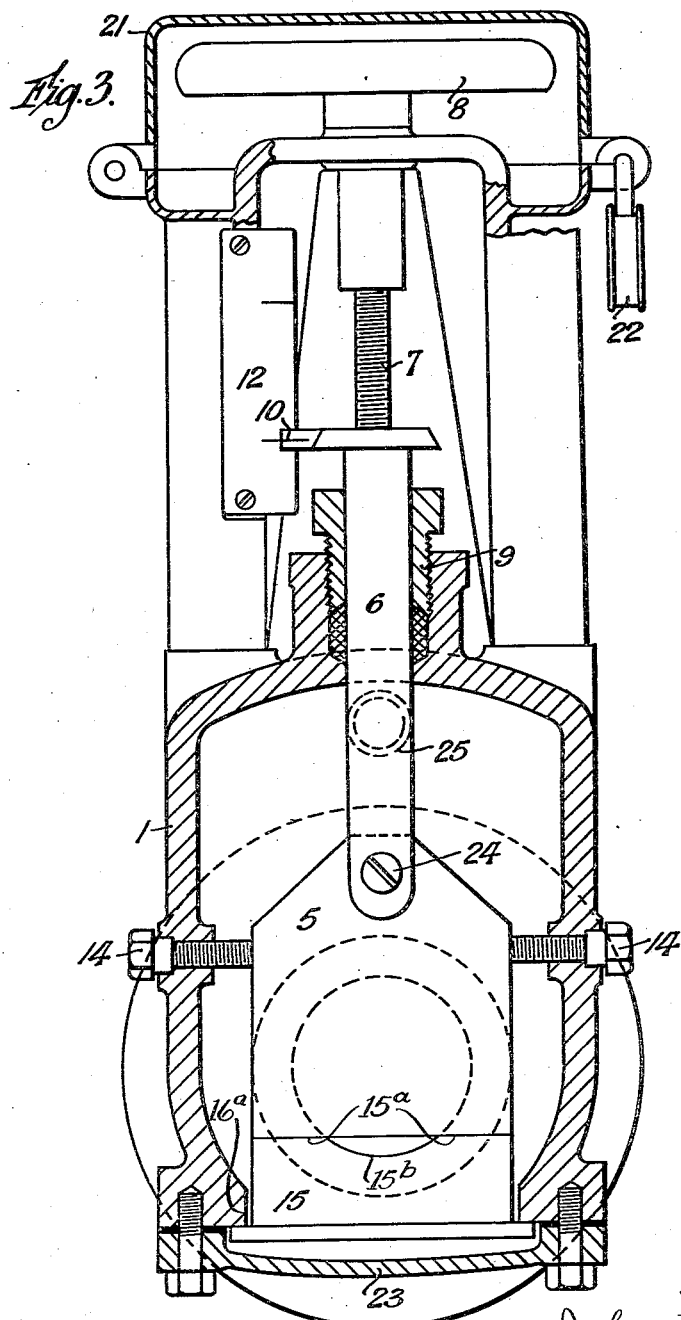

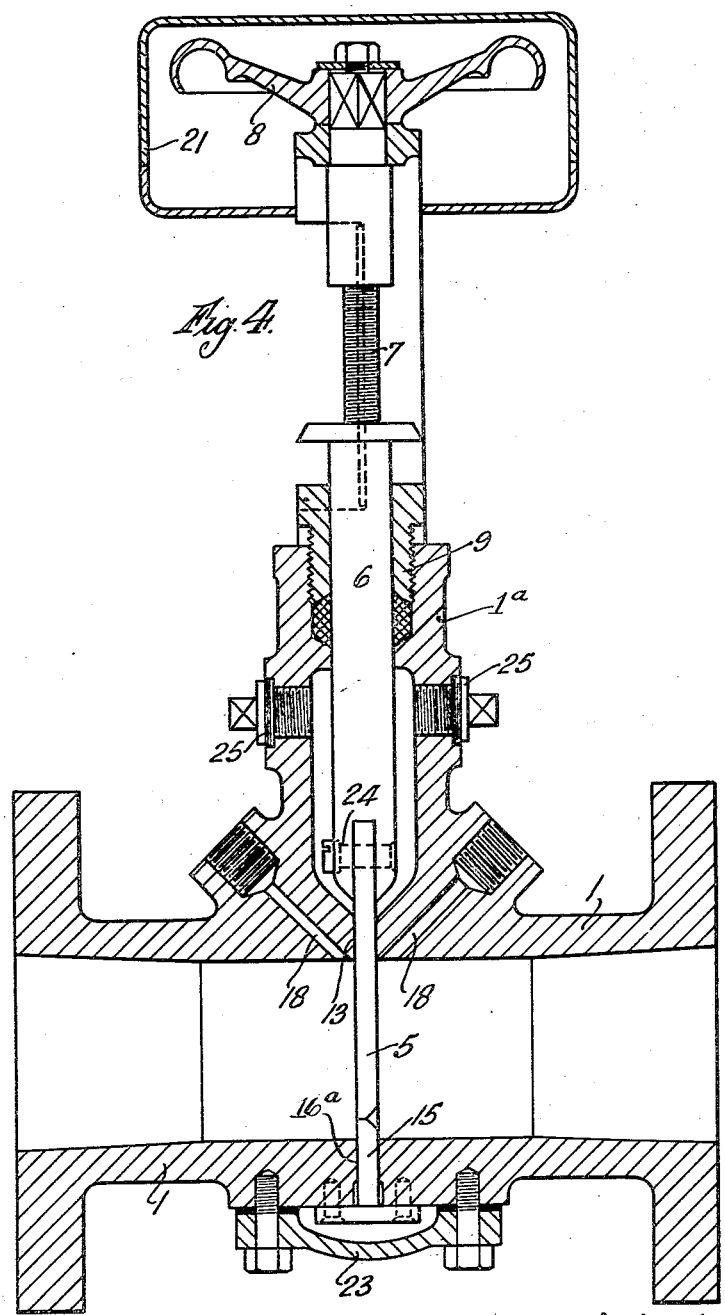

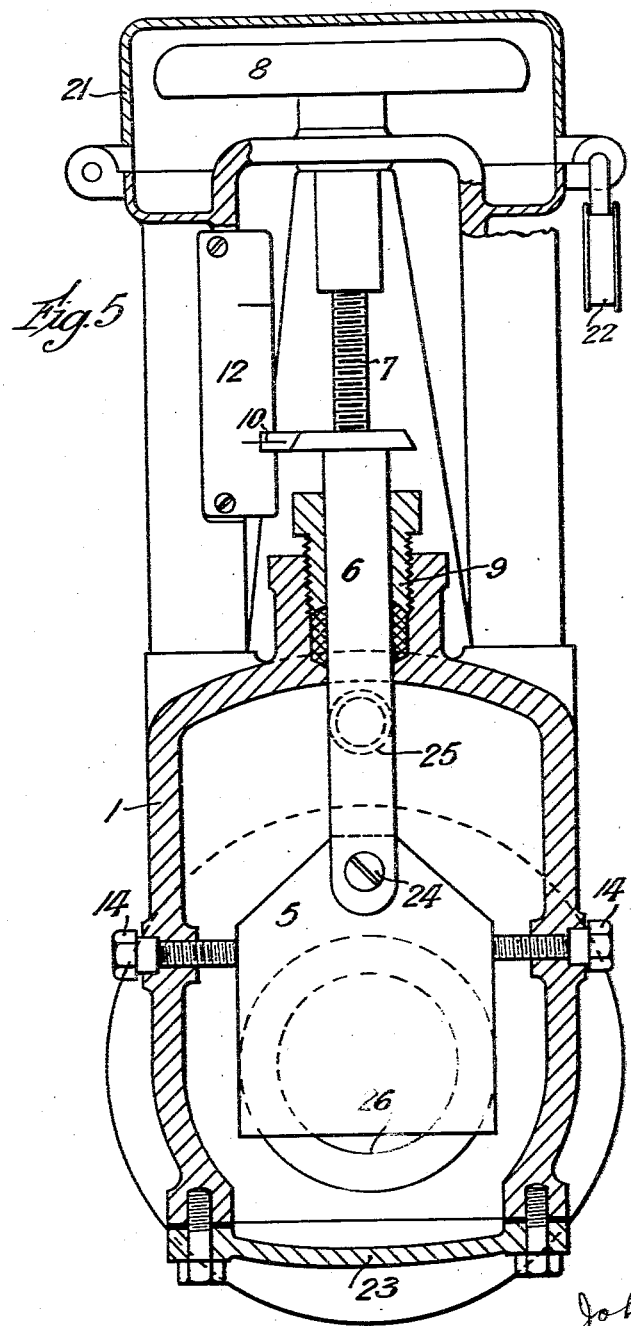

Patented Feb. 6, 1934

1,946,319

UNITED STATES PATENT OFFICE 1,946,319

VARIABLE ORIFICE FOR MEASURING THE FLOW OF FLUIDS

John Lawrence Hodgson and Horace Edward Dall, Luton, England, assignors to George Kent, Limited, London, England Application November 5, 1931. Serial No. 573,284

17 Claims. (Cl. 73—167)

This invention relates to improvements in apparatus for measuring the flow of fluids, the apparatus including a variable orifice.

The main object of the present invention is to provide an indicating arrangement for indicating the degree of opening of the orifice in which the indicated opening can easily be checked and adjusted or in which the indicating arrangement is invariable with respect to the orifice.

In apparatus constructed according to the present invention a scale and pointer are provided which indicate the position of a plate for varying the effective area of the orifice. In order to provide a definite edge for flow measurement purposes the upstream edge of the plate is made square (i. e. at right angles to the face of the plate) while the downstream edge of the plate is backed off at a suitable angle, say 45°. The edge which controls the flow may be straight so as to provide easily reproducible shapes. The plate is so arranged that under working conditions there is no appreciable leak from one side to the other. This is effected either by locating the plate in a fairly close-fitting machined cavity, or, where corrosion is likely to occur, by locating the plate in a cavity of such width as to allow considerable play to the plate, means being provided for clamping the plate on to one face (preferably the downstream face). Pressure holes are provided in the valve for taking the difference of pressure across the plate. These are preferably arranged as close as possible to the plate.

Since the internal diameter of the main to which the apparatus is fitted may vary, the upstream bore in the casing of the apparatus is preferably made conical so that the smallest diameter of the conical part is of less diameter than that of any main to which the apparatus is likely to be fitted and the largest diameter of the conical part is of greater diameter than that of any main to which the apparatus is likely to be fitted.

Preferably a stop is provided against which the plate abuts when in the zero position; the stop is secured directly (i. e. without packing) to a machined face on the casing so that the stop bears an invariable relationship with respect to the orifice, and means are provided by which a pointer, moving with the plate, can be set to indicate zero on a scale when the plate is in contact with the stop. With this construction, if the scale be carried by a cover plate which normally secures an aperture through which the plate can be inserted or withdrawn, the pointer can be set accurately to indicate the zero position in spite of any variation in the thickness of the packing between the cover plate which supports the scale and the casing.

In a modification the casing is provided at the side or bottom thereof with an aperture through which the plate can be inserted or withdrawn. With this construction there is no packing which may compress and affect the reading on the scale.

The position of the plate is preferably adjusted by a screw threaded rod which engages a thread in a tubular rod attached to the valve plate and which is actuated by a handwheel, which latter is preferably located within a cover which can be locked to prevent tampering.

In the accompanying drawings which illustrate the invention Figure 1 is a longitudinal section and Figure 2 a transverse section, Figures 3 and 4 are similar views of a modification, Figure 5 a transverse section of a further modification and Figure 6 a section of a still further modification.

Referring more particularly to Figures 1 and 2, 1 is the main body of the valve the upper end of which is closed by a cover plate 2 which is secured to the body 1 by studs and nuts 3. Between the body 1 and the cover plate 2 is inserted packing 4. 5 is a valve plate which is connected to the lower end of a rod 6. The rod 6 is internally threaded to receive a threaded rod 7 provided at its upper end with an actuating hand wheel 8. The rod 6 passes through a packing gland 9 and is provided with a pointer 10 which can be clamped to the said rod by means of a screw 11. 12 is a scale which indicates the position of the plate 5. The scale 12 may be calibrated to read in units of area of the orifice, in units of opening movements of the orifice plate, in constants determined for a particular orifice, or in other units which depend upon the characteristics of a given orifice. The plate 5 has a sliding fit in a slot 13 formed in the upper part of the main body 1. 14 are fixed screws by which the plate is guided. The bottom edge of the plate 5 on the upstream side is at right angles to the face of the plate, while the downstream edge of the plate is bevelled to an angle of about 45° (see Figure 1). 15 is a plate which forms a stop for the plate 5 when in its lowest position, the downstream edge of the top of the plate 15 also preferably being beveled at about forty-five degrees as shown in Figure 1. The stop plate 15 includes two spaced limiting surfaces 15a and an intervening arcuate surface 15b, the limiting surfaces 15a being engageable by the movable plate 5 for bringing the latter to rest positively when it closes the orifice except for the area between the straight controlling lower edge of the plate 5 and the arcuate surface 15b whereby an arcuate setting of the indicator may be made with reference to a known effective orifice area. The stop plate 15 extends through an aperture 16a in the casing, and is mounted directly on a plate 16, which is attached to the body 1 against a machined surface on the casing adjacent the aperture 16a by means of screws. 17 is a bottom cover plate which is attached to the body 1 by means of studs.

18 are pressure holes which are formed in the casing and lead to pipes 19 connected to a suitable form of differential pressure measuring device, not shown. Pressure holes 18 are preferably located close to and one on either side of the plate 5. 20 shows a liner of non-corrosive metal which may be employed to provide a working surface for the downstream side of the plate in cases in which corrosive fluids are likely to be employed. 21 is a cover enclosing the actuating hand wheel 8, the cover being hingedly connected to a support carried by the cover plate 2. The cover can be secured in position by means of a padlock 22.

In the construction shown in Figure 1 if the cover plate 2 be removed for any purpose, for example to inspect the plate 5 and the cover be replaced, or if fresh packing 4 be inserted or if a workman tightens the nuts 3, the thickness of the packing is liable to be altered in which case the pointer 10 will give incorrect reading.

It is therefore made adjustable by the clamping screw 11, the valve plate 5 being pressed up against the stop plate 15 in order to obtain the correct zero position.

Figures 3 and 4 illustrate modified arrangements in which to overcome the disadvantage due to the effect of the compression of the packing 4 on the zero position the joint is eliminated, thus rendering the dimension between the stop 15 and the scale 12 invariable, and rendering it unnecessary to provide an adjustable pointer.

In order to provide for the withdrawal of the valve plate, the valve body is provided with an aperture and cover plate 23 which are located at the bottom of the valve body. The connection between the plate 5 and rod 6 is made detachable and to effect this, the connection comprises a screw 24 to which access can be had through apertures in an extension 1a of the casing, the apertures normally being sealed by screw plugs 25.

Figure 5 illustrates an arrangement similar to that shown in Figure 4 except that the stop plate 15 is dispensed with, the fixed limiting surface being formed in the casing itself. 26 designates the smallest part of the conical bore through the casing 1.

In the modification shown in Figure 6 which is suitable for use in cases in which corrosive fluids are to be measured the slot 13 in the casing through which the plate 5 moves is made wider than the width of the plate and the plate is clamped on to one face, preferably the downstream face (after the valve has been set) by means of a bolt 27. Any other equivalent construction may be used for this purpose.

Provision may be made for cleaning the orifice by injecting suitable cleansing liquid under the pressure either through the pressure holes 18 or through suitably placed nozzles. The apparatus may be cleansed by squirting liquid on to the vital parts through holes in the wall of the valve, but without taking the valve out of the main, the pressure holes themselves serving as suitable cleansing holes if the pressure pipes 19 be removed and liquid under pressure introduced through these holes into the empty valve casing.

What we claim is:—

1. In apparatus for measuring the flow of fluids, the combination of a casing having an orifice and adapted for connection in a pipe line, a slot formed in said casing adjacent said orifice, a movable plate mounted for sliding movements in the slot for controlling the effective area of the orifice and which is permitted unhindered movement throughout a constant range of movement, said slot being considerably wider than the thickness of said plate, and one side of the slot forming a seating for said plate, means for holding the plate in sliding engagement with said seating, the said means when released permitting the plate considerable play, operating means for effecting movement of the plate, and an indicator for indicating the position of the plate with respect to the orifice, said indicator comprising an element carried by the casing and an element moved with the plate, said casing having pressure holes for allowing differential pressure created by the plate to be transmitted to a pressure responsive device, the whole arrangement being such that the indicated relationship of the plate with respect to the orifice is invariable or can be checked and adjusted.

2. In apparatus for measuring the flow of fluids, the combination of a casing having an orifice and adapted for connection in a pipe line and having a limiting surface in invariable relationship with respect to the orifice, a movable plate for controlling the effective area of the orifice and which is permitted unhindered movement throughout a constant range of movement, the movement of the plate being limited by the limiting surface, the limiting surface and cooperating surface of the plate forming portions of the flow orifice and being beveled to provide a reduced limiting surface, operating means for effecting movement of the plate, and an indicator for indicating the position of the plate with respect to the orifice, said indicator comprising an element carried by the casing and an element moved with the plate, said casing having pressure holes for allowing differential pressure created by the plate to be transmitted to a pressure responsive device, the whole arrangement being such that the indicated relationship of the plate with respect to the orifice is invariable or can be checked and adjusted.

3. In apparatus for measuring the flow of fluids, the combination of a casing having an orifice and adapted for connection in a pipe line, a movable plate for controlling the effective area of the orifice and which is permitted unhindered movement throughout a constant range of movement, a fixed plate connected to the casing in invariable relationship with respect to the orifice and having a surface for limiting the movement of the movable plate, the limiting surface on said fixed plate being so located with respect to said orifice as to be engaged by and to arrest movement of said movable plate before the latter has closed the orifice completely, and simultaneously with the movable plate's providing a known minimum effective orifice area, operating means for effecting movement of the movable plate, said operating means including a screw threaded rod and nut gear, and an indicator for indicating the position of the plate with respect to the orifice, said indicator comprising an element carried by the casing and an element adjustably connected to and movable with the plate, said casing having an aperture through which said plate can be withdrawn, a detachable cover plate for normally sealing said aperture, said casing having pressure holes for allowing differential pressure created by the plate to be transmitted to a pressure responsive device, the whole arrangement being such that the indicated relationship of the plate with respect to the orifice can be checked and adjusted.

4. In apparatus for measuring the flow of fluids, the combination of a casing having an orifice and adapted for connection in a pipe line, a movable plate for controlling the effective area of the orifice and which is permitted unhindered movement throughout a constant range of movement, a fixed plate connected to the casing in invariable relationship with respect to the orifice and having a surface for limiting the movement of the movable plate, the limiting surface on said fixed plate being so located with respect to said orifice as to be engaged by and to arrest movement of said movable plate before the latter has closed the orifice completely, and simultaneously with the movable plate's providing a known minimum effective orifice area, operating means for effecting movement of the plate, said operating means including a screw threaded rod and nut gear, an indicator for indicating the position of the plate with respect to the orifice, said indicator comprising an element carried by the casing and an element moved with the plate, the elements being located respectively in invariable relationship with respect to the orifice and plate, said casing having an aperture through which said plate can be withdrawn, and a detachable cover plate for normally sealing said aperture, said casing having pressure holes for allowing differential pressure created by the plate to be transmitted to a pressure responsive device the whole arrangement being such that the indicated relationship of the plate with respect to the orifice is invariable.

5. In apparatus for measuring the flow of fluids, the combination of a casing having an orifice and adapted for connection in a pipe line, a movable plate for controlling the effective area of the orifice and which is permitted unhindered movement throughout a constant range of movement, a fixed plate connected to the casing in invariable relationship with respect to the orifice and having a surface for limiting the movement of the movable plate, the limiting surface and the co-operating surface of the movable plate being shaped to provide a definite and easily reproducible co-efficient, operating means for effecting movement of the plate, said operating means including a screw threaded rod and nut gear, an indicator for indicating the position of the plate with respect to the orifice, said indicator comprising an element carried by the casing and an element moved with the plate, the elements being located respectively in invariable relationship with respect to the orifice and plate, said casing having an aperture through which said plate can be withdrawn, and a detachable cover plate for normally sealing said aperture through which the plate can be withdrawn, said casing having pressure holes for allowing differential pressure created by the plate to be transmitted to a pressure responsive device, the whole arrangement being such that the indicated relationship of the plate with respect to the orifice is invariable.

6. In apparatus for measuring the flow of fluids, the combination of a casing having an orifice and being adapted for connection in a pipe line; a plate mounted for movements transversely of said orifice for controlling the effective area of the latter, said casing being provided with pressure holes for allowing differential pressure created by the plate to be transmitted to a pressure responsive device; operating means connected to said plate for effecting movements of the latter; an indicator for indicating the position of the plate with respect to the orifice, said indicator including an element carried by the casing and an element connected to said plate and movable with the latter relative to said casing carried element; and means carried by said casing and so located with respect to said orifice as to be engageable by said movable plate before the latter has closed the orifice completely for bringing the plate to rest positively when it reaches a predetermined position with respect to said orifice and immediately upon the plate's reaching a position to provide a definitely minimum effective orifice area whereby an accurate zero setting of said indicator may be made with reference to said known effective orifice area.

7. In apparatus for measuring the flow of fluids, the combination of a casing having an orifice and being adapted for connection in a pipe line; a plate mounted for movements transversely of said orifice for controlling the effective area of the latter, said casing being provided with pressure holes for allowing differential pressure created by the plate to be transmitted to a pressure responsive device; operating means connected to said plate for effecting movements of the latter; an indicator for indicating the position of the plate with respect to the orifice, said indicator including an element carried by the casing and an element rigidly connected to said plate and movable with the latter relative to said casing carried element; and means carried by said casing and so located with respect to said orifice as to be engageable by said movable plate before the latter has closed the orifice completely for bringing the plate to rest positively when it reaches a predetermined position with respect to said orifice and immediately upon the plate's reaching a position to provide a definitely known minimum effective orifice area whereby an accurate zero setting of said indicator may be made with reference to said known effective orifice area.

8. In apparatus for measuring the flow of fluids, the combination of a casing having an orifice and being adapted for connection in a pipe line; a plate mounted for movements transversely of said orifice for controlling the effective area of the latter, said casing being provided with pressure holes for allowing differential pressure created by the plate to be transmitted to a pressure responsive device; operating means connected to said plate for effecting movements of the latter; an indicator for indicating the position of the plate with respect to the orifice, said indicator including an element carried by the casing and an element connected to said plate and movable with the latter relative to said casing carried element, said casing being formed with an aperture disposed in the line of travel of said plate and the surface of the casing being machined adjacent said aperture; a stop plate mounted in said aperture and extending into said casing; and means mounted against said machined surface and connected to said stop plate for maintaining the latter in a position to be engaged by said movable plate for bringing the latter to rest positively when it reaches a predetermined position with respect to said orifice and immediately upon the movable plate's reaching a position to provide a definitely known effective orifice area whereby an accurate zero setting of said indicator may be made with reference to said known effective orifice area.

9. In apparatus for measuring the flow of fluids, the combination of a casing having an orifice and being adapted for connection in a pipe line; a plate mounted for movements transversely of said orifice for controlling the effective area of the latter, said casing being provided with pressure holes for allowing differential pressure created by the plate to be transmitted to a pressure responsive device; operating means connected to said plate for effecting movements of the latter; an indicator for indicating the position of the plate with respect to the orifice, said indicator including an element fixed to said casing in invariable relationship to said orifice, an element adapted to be fixedly connected to said plate, and means for mounting said last named element in adjusted position with respect to said plate; and means carried by said casing and so located with respect to said orifice as to be engageable by said movable plate before the latter has closed the orifice completely for bringing the plate to rest positively when it reaches a predetermined position with respect to said orifice and immediately upon the plate's reaching a position to provide a definitely known minimum effective orifice area whereby an accurate zero setting of said indicator may be made with reference to said known effective orifice area.

10. In apparatus for measuring the flow of fluids, the combination of a casing having an orifice and being adapted for connection in a pipe line; a plate mounted for movements transversely of said orifice for controlling the effective area of the latter, said casing being provided with pressure holes for allowing differential pressure created by the plate to be transmitted to a pressure responsive device; operating means connected to said plate for effecting movements of the latter; an indicator for indicating the position of the plate with respect to the orifice, said indicator including an element carried by the casing and an element connected to said plate and movable with the latter relative to said casing carried element; and a limiting surface in said casing and so located with respect to said orifice as to be engageable by said movable plate before the latter has closed the orifice completely for bringing the plate to rest positively when it reaches a predetermined position with respect to said orifice and immediately upon the plate's reaching a position to provide a definitely known minimum effective orifice area whereby an accurate zero setting of said indicator may be made with reference to said known effective orifice area.

11. In apparatus for measuring the flow of fluids, the combination of a casing having an orifice and conical inlet and outlet passages on opposite sides of the orifice, said passages being adapted for connection in a pipe line; a plate mounted for movements transversely of said orifice for controlling the effective area of the latter, said casing being provided with pressure holes for allowing differential pressure created by the plate to be transmitted to a pressure responsive device; operating means connected to said plate for effecting movements of the latter; an indicator for indicating the position of the plate with respect to the orifice, said indicator including an element carried by the casing and an element connected to said plate and movable with the latter relative to said casing carried element; and a limiting surface in said casing in fixed relation to said orifice and engageable by said plate for bringing the latter to rest positively when it reaches a predetermined position with respect to said orifice and immediately upon the plate's reaching a position to provide a definitely known effective orifice area whereby an accurate zero setting of said indicator may be made with reference to said known effective orifice area.

12. In apparatus for measuring the flow of fluids, the combination of a casing having a flow passage adapted for connection in a pipe line, an extension on said casing substantially normal to said flow passage, said casing being provided with a guide way substantially normal to said flow passage and with an aperture extending through said casing in the line of said guide way and opposite said casing extension; a plate mounted for movements in said guide way transversely of said orifice for controlling the effective area of the latter and projecting into said casing extension and being adapted to be withdrawn through said aperture, said casing being provided with pressure holes for allowing differential pressure created by said plate to be transmitted to a pressure responsive device; operating means extending inwardly through said casing extension for connection with said plate; means for detachably connecting said plate to said operating means within said casing extension, said casing extension being formed with an opening for providing access to said connecting means; a removable closure for said opening; and means connected to said casing for closing said aperture.

13. In apparatus for measuring the flow of fluids, the combination of a casing having a flow passage adapted for connection in a pipe line, an extension integral with said casing substantially normal to said flow passage, said casing being provided with a guide way substantially normal to said flow passage and with an aperture extending through said casing in the line of said guide way and opposite said casing extension; a plate mounted for movements in said guide way transversely of said orifice for controlling the effective area of the latter and projecting into said casing extension and being adapted to be withdrawn through said aperture, said casing being provided with pressure holes for allowing differential pressure created by said plate to be transmitted to a pressure responsive device; operating means extending inwardly through said casing extension for connection with said plate; means for detachably connecting said plate to said operating means within said casing extension, said casing extension being formed with an opening for providing access to said connecting means; a removable closure for said opening; means connected to said casing for closing said aperture; and an indicator for indicating the position of the plate with respect to the orifice, said indicator including an element carried by the casing and an element connected to said plate and movable with the latter relative to said casing carried element.

14. In apparatus for measuring the flow of fluids, the combination of a casing having a flow passage adapted for connection in a pipe line, an extension on said casing substantially normal to said flow pasage, said casing being provided with a guide way substantially normal to said flow passage and with an aperture extending through said casing in the line of said guide way and opposite said casing extension; a plate mounted for movements in said guide way transversely of said orifice for controlling the effective area of the latter and projecting into said casing extension and being adapted to be withdrawn through said aperture, said casing being provided with pressure holes for allowing differential pressure created by said plate to be transmitted to a pressure responsive device; operating means extending inwardly through said casing extension for connection with said plate; means for detachably connecting said plate to said operating means within said casing extension, said casing extension being formed with an opening for providing access to said connecting means; a removable closure for said opening; means connected to said casing for closing said aperture; and a limiting surface in said casing in fixed relation to said orifice and being engageable by said plate for bringing the latter to rest positively when it reaches a predetermined position with respect to said orifice and immediately upon the plate's reaching a position to provide a definitely known effective orifice area whereby an accurate zero setting of said indicator may be made with reference to said known effective orifice area.

15. In apparatus for measuring the flow of fluids, the combination of a casing having a flow passage adapted for connection in a pipe line, an extension on said casing substantially normal to said flow passage, said casing being provided with a guide way substantially normal to said flow passage and with an aperture extending through said casing in the line of said guide way and opposite said casing extension; a plate mounted for movements in said guide way transversely of said orifice for controlling the effective area of the latter and projecting into said casing extension, said casing being provided with pressure holes for allowing differential pressure created by said plate to be transmitted to a pressure responsive device; operating means extending inwardly through said casing extension for connection with said plate; means for detachably connecting said plate to said operating means within said casing extension, said casing extension being formed with an opening for providing access to said connecting means; a removable closure for said opening; and a stop plate mounted in said aperture for closing the latter and extending into said flow passage for being engaged by said first named plate to limit movement of the latter.

16. In apparatus for measuring the flow of fluids, the combination of a casing having an orifice and being adapted for connection in a pipe line; a plate mounted for movements transversely of said orifice for controlling the effective area of the latter, the controlling edge of the plate being straight, said casing being provided with pressure holes for allowing differential pressure created by the plate to be transmitted to a pressure responsive device; operating means connected to said plate for effecting movements of the latter; an indicator for indicating the position of the plate with respect to the orifice, said indicator including an element carried by the casing and an element connected to said plate and movable with the latter relative to said casing carried element; spaced limiting surface portions in said casing in fixed relation to said orifice; and an arcuate surface portion in said casing intervening between said limiting surface portions, said limiting surface portions being engageable by said plate for bringing the latter to rest positively when it closes said orifice except for the area between the straight controlling edge of the plate and said arcuate surface whereby an accurate setting of said indicator may be made with reference to a known effective orifice area.

17. In apparatus for measuring the flow of fluids, the combination of a casing having a flow passage adapted for connection in a pipe line, an extension on said casing substantially normal to said flow passage, said casing being provided with a guide way substantially normal to said flow passage and with an aperture extending through said casing in the line of said guide way and opposite said casing extension; a plate mounted for movements in said guide way transversely of said orifice for controlling the effective area of the latter and projecting into said casing extension and being adapted to be withdrawn through said aperture, said casing being provided with pressure holes for allowing differential pressure created by said plate to be transmitted to a pressure responsive device; operating means extending inwardly through said casing extension and being detachably connected to said plate; and means connected to said casing for closing said aperture.

JOHN LAWRENCE HODGSON.
HORACE EDWARD DALL.